Aug. 2, 1966  W. SCHMIDT  3,263,583
ELECTRONIC FLASH UNIT FOR PHOTOGRAPHIC PURPOSES
Filed Aug. 17, 1962
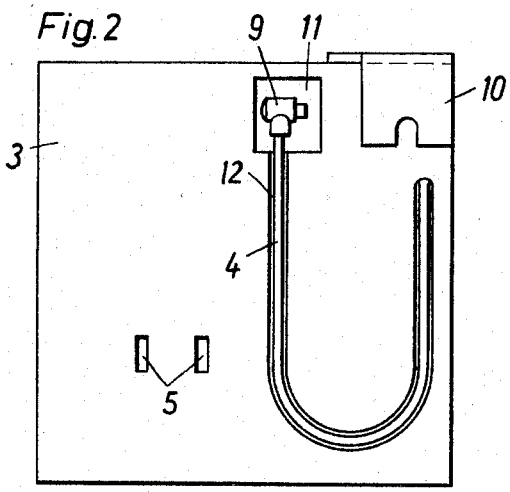
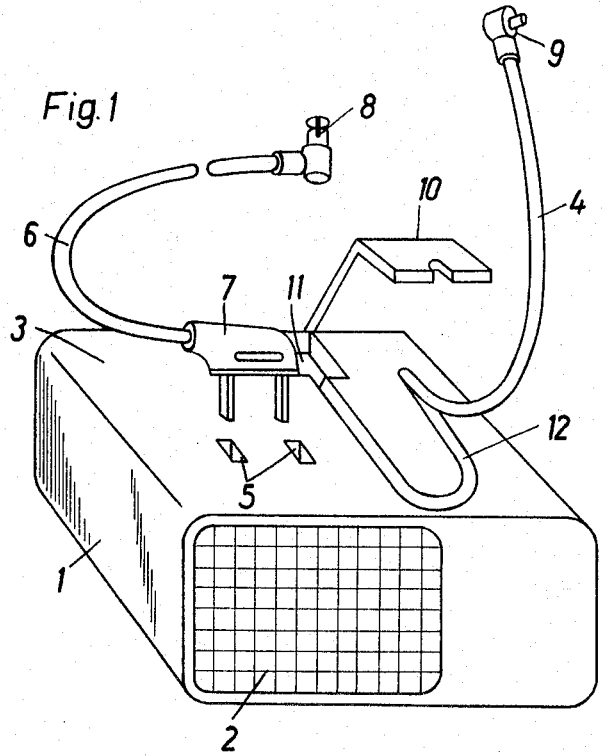
Inventor:
Walter Schmidt United States Patent Office 3,263,583
Patented August 2, 1966

3,263,583
ELECTRONIC FLASH UNIT FOR PHOTOGRAPHIC PURPOSES
Walter Schmidt, Berlin-Lichterfelde, Germany, assignor to Loewe Opta G.m.b.H., Berlin, Germany, a company of Germany
Filed Aug. 17, 1962, Ser. No. 218,231
3 Claims. (Cl. 95—11)

The invention relates to electronic flash units for photographic purposes, and more specifically to portable one-piece flash units, and has for its object the realization of an optimum design of such apparatus as regards the connection of the flash unit to the synchronizing contact of the camera.

The hitherto known electronic flash units are provided in general with a preferably integrally attached synchronizing cable which connects the flash unit to the synchronizing contact of the camera. These synchronizing cables are fitted with a special flash contact plug designed to be inserted into the synchronizing contact of the camera. There are some types of cameras such as the "Leica," the "Rolleiflex," or other cameras of foreign make which have a different flash contact plug. In such cases, the proper synchronizing cable is then often not available so that the flash unit cannot be readily connected to the camera. It is the object of the invention to eliminate the above-mentioned drawback.

The electronic flash unit according to the invention is characterized by the use of two synchronizing cables having different plugs for connecting the flash unit to the synchronizing contact of the camera. According to the invention one of the synchronizing cables is designed as a conventional synchronizing cable integrally attached to the flash unit, and the second synchronizing cable is designed so as to have at its one end a plug suitable to be connected to a socket member fitted into the casing of the flash unit and at the other end a special plug fitting a special synchronizing contact of another camera type.

Moreover, the synchronizing cable integrally attached to the flash unit is designed to be inserted when not in use into a recess or groove shaped in the body of the flash unit to follow the length of the cable, in such a manner that it will not stick out loosely but forms a mechanically integral structure with the flash unit.

A preferred embodiment of the invention will now be described by way of example and with reference to the accompanying drawing in which:

FIG. 1 shows a perspective view of the one-piece electronic flash unit of flat design, including the two connection cables, and FIG. 2 is a reversed end-for-end top plan view showing that side of the body of the electronic flash unit, in which the socket member is provided adjacent the synchronizing cable integrally attached to the flash unit.

In FIG. 1 reference numeral 1 designates the body or casing of the one-piece electronic flash unit which is provided at one of its narrow sides with the reflector 2. According to the invention in the body wall 3 of the electronic flash unit, adjacent the integrally attached synchronizing cable 4, a socket member 5 is provided, into which the additional synchronizing cable 6 can be inserted by means of the plug structure 7, as suggested by the invention at its one free end. This additional synchronizing cable 6 is fitted at the other end to be connected to the camera with a plug 8 designed, for example, to connect the flash unit to the special synchronizing contact of foreign-made cameras and having a form different from that of plug 9 attached to the other synchronizing cable 4. The integrally attached synchronizing cable 4 is usually fitted with a conventional plug 9 designed to be connected to cameras of German make. Reference numeral 10 designates a push-in shoe secured to the electronic flash unit and serving to fix the electronic flash unit either to the camera or to a support rail. 12 is a groove within the wall 3 of casing 1, and 11 represents a recess for receiving plug 9.

In FIG. 2 the socket member 5 can be seen from above as being directly adjacent the synchronizing cable 4 lying in a groove 12 shaped to follow the length of the cable 4. This groove 12 is recessed in the body wall 3 so as to permit the synchronizing cable when not in use to be firmly and unshiftably pressed into said groove. This position of the cable is shown in FIG. 2 of the drawing. Furthermore a recess 11 is provided within the body wall 3 of the casing 1.

The invention affords the special advantage of enabling the electronic flash unit to be instantly connected even to cameras that are provided with a special synchronizing contact for the synchronizing cable. The synchronizing cable 4 integrally attached to the electronic flash unit is fitted with a standard plug 9 commonly used for instance in German flash units. The plug socket 5 in the body of the flash unit casing has a form suitable for plugs commonly used in other countries, for example in USA flash units.

What I claim is:

1. In an electronic flash unit for photographic purposes usable in connection with a camera comprising a casing containing the electrical components and the reflector inclusive of the flash lamp, a synchronizing cable for electrically connecting said electrical components with the synchronizing contact of the camera, and a plug socket within said casing electrically connected to said electrical components, an additional separate synchronizing cable, said first synchronizing cable being integrally attached to said casing and being supplied at its free end with a conventional plug fitting the synchronizing contact of the camera, said additional separate connection cable being supplied at its one free end with a plug fitting said plug socket within said casing and at its other free end with a plug fitting a special synchronizing contact of another camera.

2. In an electronic flash unit for photographic purposes usable in connection with a camera comprising a casing containing the electrical components and the reflector inclusive the flash lamp, a synchronizing cable for electrically connecting said electrical components with the synchronizing contact of the camera, a guide groove and a recess within the outer surface of said casing suitable for inserting said synchronizing cable, and a plug socket within said casing electrically connected to said electrical components, an additional separate synchronizing cable, said first synchronizing cable being integrally attached to said casing and being supplied at its free end with a conventional plug fitting the synchronizing contact of the camera, said additional separate connection cable being supplied at its one free end with a plug fitting said plug socket within said casing and at its other free end with a plug fitting a special synchronizing contact of another camera, said guide groove and said recess used for inserting said first synchronizing cable when not in use being arranged within the body of one side wall of said casing, the length of said guide groove corresponding to the length of said cable and said recess being suitably formed for receiving the plug of said cable.

3. In an electronic flash unit for photographic purposes usable in connection with a camera comprising a casing containing the electrical components and the reflector inclusive of the flash lamp, a synchronizing cable having a plug at its free end for electrically connecting said electrical components with the synchronizing contact of the camera, a guide groove and a recess within the outer surface of said casing, said guide groove and said recess used for inserting said synchronizing cable when not in use being arranged within the body of one side wall of said casing, the length and width of said guide groove corresponding to the length and thickness of said cable, and said recess being suitably formed for receiving the plug of said cable.

References Cited by the Examiner

UNITED STATES PATENTS

| | | | |
|---|---|---|---|
| 1,659,160 | 2/1928 | Richards | 191—12.2 |
| 2,143,529 | 1/1939 | White. | |
| 2,258,140 | 10/1941 | Kaletay | 95—53 |
| 2,783,696 | 3/1957 | Sewig | 240—1.3 X |
| 2,784,305 | 3/1957 | Lawson | 240—8.18 |
| 2,976,511 | 3/1961 | Lipsitz | 240—1.3 X |

FOREIGN PATENTS

| | | |
|---|---|---|
| 1,024,147 | 1/1953 | France. |
| 1,090,765 | 10/1954 | France. |
| 1,126,510 | 7/1956 | France. |

JOHN M. HORAN, *Primary Examiner.*

JOHN P. WILDMAN, NORTON ANSHER, *Examiners.*

R. F. ROTELLA, *Assistant Examiner.*